(12) United States Patent
Clapper (10) Patent No.: US 7,406,715 B2
(45) Date of Patent: Jul. 29, 2008

(54) CONTROLLING AND REMOTELY MONITORING ACCESSED NETWORK DATA

(75) Inventor: Edward O. Clapper, Tempe, AZ (US)

(73) Assignee: Intel Corp., Santa Clara, CA (US)

( * ) Notice: Subject to any disclaimer, the term of this patent is extended or adjusted under 35 U.S.C. 154(b) by 703 days.

(21) Appl. No.: 10/393,454

(22) Filed: Mar. 19, 2003

(65) Prior Publication Data

US 2004/0186989 A1 Sep. 23, 2004

(51) Int. Cl.
*G08B 23/00* (2006.01)

(52) U.S. Cl. ......................................... 726/25
(58) Field of Classification Search .................... 726/25
See application file for complete search history.

(56) References Cited

U.S. PATENT DOCUMENTS 6,445,783 B1* 9/2002 Creswell et al. ........ 379/207.13
6,681,232 B1* 1/2004 Sistanizadeh et al. .... 707/104.1
2003/0040932 A1* 2/2003 Sato ............................. 705/1
2003/0159070 A1* 8/2003 Mayer et al. ................ 713/201

* cited by examiner

*Primary Examiner*—Kambiz Zand
*Assistant Examiner*—Aubrey H Wyszynski
(74) *Attorney, Agent, or Firm*—Schwabe, Williamson & Wyatt, P.C.

(57) ABSTRACT

An environment for remote monitoring of a device, such as a child's computer, from a television or other monitor device. The monitored device has a security layer, which may be implemented in hardware, software, or a combination of the two, where the security layer inspects some or all accessed network data or network access activities, including real-time content such as chat rooms and the like. While the monitored device is used to access network data, alerts are displayed on the remote monitoring device to allow an adult or other responsible entity to keep track of material. Thus, for example, an adult may watch television, confident that an alert will be displayed in a corner of the television screen if necessary to alert the adult to any problems. For serious alerts, the security layer may automatically block or shutdown offending network application programs.

21 Claims, 6 Drawing Sheets

CONTROLLING AND REMOTELY MONITORING ACCESSED NETWORK DATA

FIELD OF THE INVENTION

The invention generally relates to monitoring and controlling access to network data, and more particularly to a system providing alerts regarding accessed network data to a remote monitor such as a television.

BACKGROUND

With the proliferation of hardware and software to facilitate connecting to networks, such as the Internet and other networks, it has become increasingly easier for providers of prurient material to arrange for such material to be presented to children while they are connected to a network.

Increasing protections against such content is required.

BRIEF DESCRIPTION OF THE DRAWINGS

The features and advantages of the present invention will become apparent from the following detailed description of the present invention in which.

DETAILED DESCRIPTION

Figure 1:
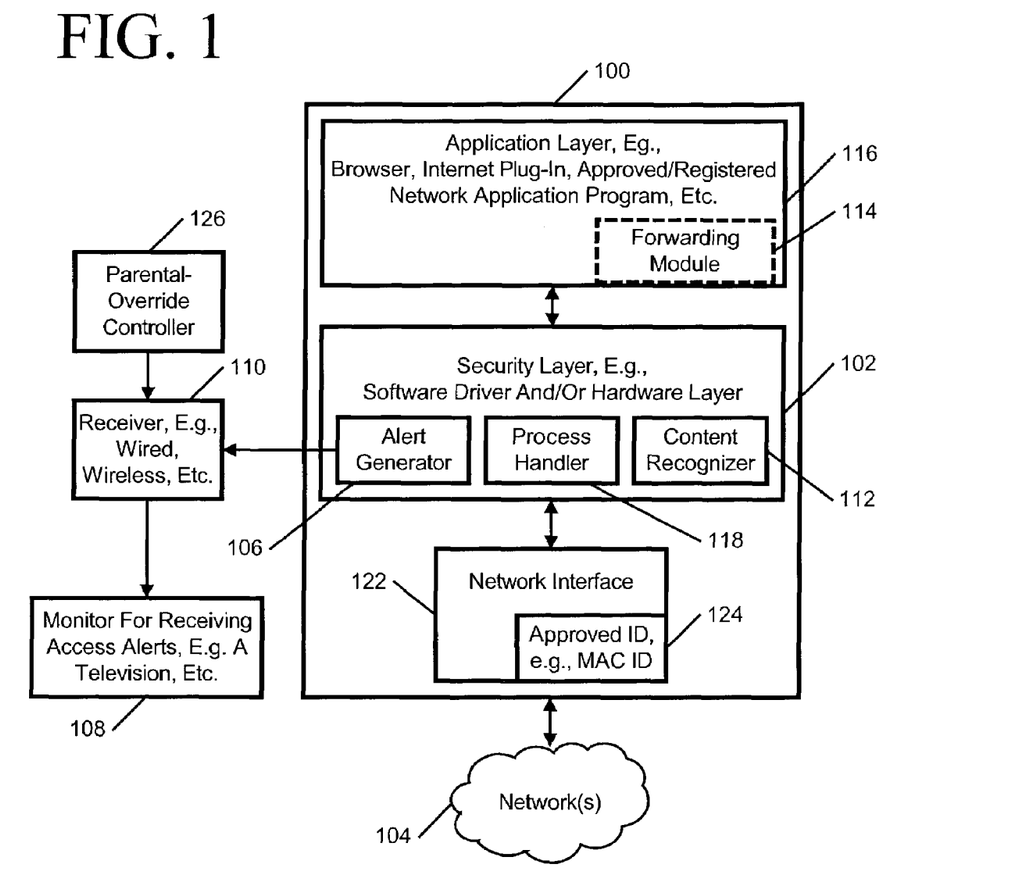
FIG. 1 illustrates a system according to one embodiment for protecting children from undesirable network data or content.

FIG. 1 illustrates a system according to one embodiment for protecting children from undesirable network data or content, e.g., HTML (HyperText Markup Language), Java, JavaScript, XML (Extensible Markup Language), pictures, etc. It should be appreciated that while the present description focuses on protecting children, the techniques herein are applicable to monitoring and/or protecting other entities and environments.

Illustrated is a device 100, such as a computer, including a security layer 102, such as a hardware and/or software based security component, for monitoring and controlling access to a network 104 such as the Internet, a wide area network (WAN), or other network. The security layer 102 is assumed installed by an administrator, such as a parent, and expected to be password-protected against uninstall and configuration changes. The security layer includes an alert generator 106 responsible providing network access status and/or security alerts to a monitor 108, which may be a television or other output device. The monitor may be wired or wirelessly coupled with the alert generator, and the alert generator is responsible for providing alerts in an appropriate format for display by the monitor. In the illustrated embodiment, the alert generator is wirelessly linked to a receiver 110 for the monitor, where the receiver is configured to receive the alert and provide it in an appropriate manner to the monitor. Thus, a child's bedroom computer may be conveniently distant from a family room television used to monitor the device; the monitor may be used to simultaneous monitor several devices.

In the illustrated embodiment, the security layer also includes a content recognizer 112, e.g., a filter, parser, etc., possibly rules-based, used by the security layer to identify content of interest, e.g., prurient or otherwise inappropriate or undesired content. One of many content recognizers known in the art may be used to implement the content recognizer. The content recognizer may be self-contained within the security layer, or it may utilize external scanning resources, such as network sites maintaining "black lists" of banned network sites, or sites providing scanning services. The security layer may be configured as a proxy/gateway, allowing direct inspection of network content. Instead of operating as a proxy or gateway, a forwarding module 114, plug-in, etc. may be installed within an application layer 116, where the module provides some or all of accessed network content to the content recognizer 112. The illustrated application is intended to generally reference network-aware application programs, such as operating system components, chat programs, instant messengers, Internet browsers, or the like. It will be appreciated that as times change, new protocols and data formats will be developed; the content recognizer may, of course, be adapted to identify undesirable content within these new protocols and data formats.

In the illustrated embodiment, the security layer also includes a process handler 118 that may be used to control, e.g., stop, suspend, block, etc., application programs or processes. For example, the process handler may immediately terminate an Internet browser if a serious access violation has occurred. (See, e.g., FIG. 5.) It is assumed the security layer 102 is installed in the device by a parent or other entity responsible for protecting users, e.g., children, of the device 100. In one embodiment the security layer is password protected to prevent unexpected changes to the security layer's configuration.

To increase security, the security layer may be configured to only allow certain network access by the device, such as WAN or Internet access, to occur with a particular network interface (NIC) 122. For example, when configuring the security layer, the MAC (Media Access Control) ID 124 of the network interface may be recorded. Similarly, the security layer may be configured to only allow certain approved or registered network application programs 116 or network 104 sites to communicate with the device 100. Registration of sites may be effected by associating a security certificate with particular network sites, where a certificate authority is tasked with approving sites as having acceptable content; the security layer may only allow content from sites providing a valid security certificate on contacting the site.

As a convenience, a parental override controller 126, such as a wireless device communicatively coupled with the receiver 110, may be used to allow a parent or other monitoring entity to respond to alerts displayed on the monitor 108. For example, an alert may indicate network access has been blocked, and the controller 126 may be used to authorize continued network access (after an appropriate explanation of the problem by the user of the device 100). The controller may be a standalone device, incorporated into the receiver 110, or disposed within another controller, such as a universal or other remote control for controlling the television or other media devices.

Figure 2:
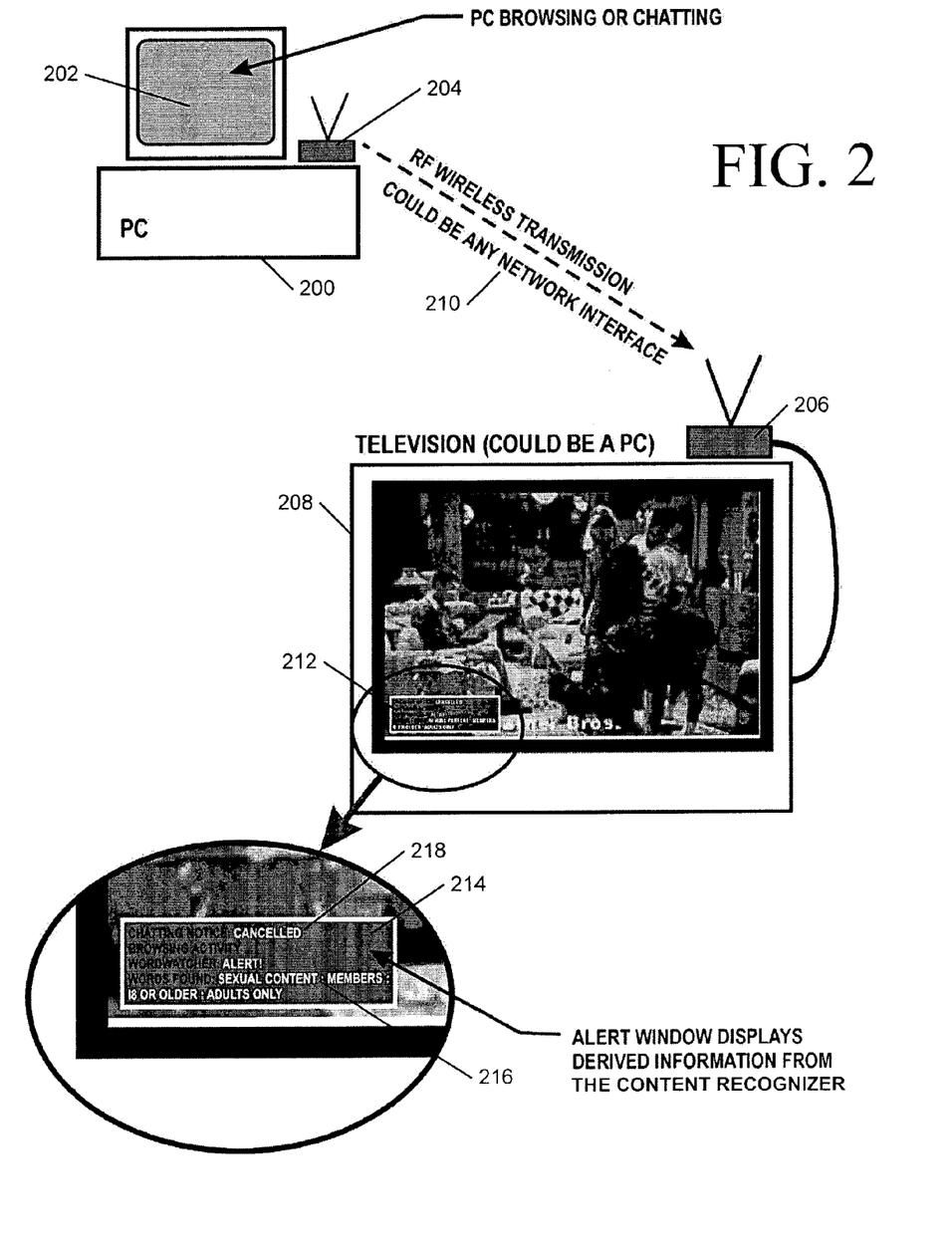
FIG. 2 illustrates one exemplary embodiment of FIG. 1.

FIG. 2 illustrates one exemplary embodiment of FIG. 1. Illustrated is a personal computer (PC) 200 operating a pc browsing or chatting network application program 202 such as Internet browser, Netscape Navigator, the ICQ instant messaging program by Mirabilis LTD.

Attached to the personal computer is a transmitter (or transceiver for two-way communication, e.g., to receive commands from a parental override control 126. The transmitter communicates with a receiver 206 (or transceiver) attached to a television 208 that is being used as a monitor 108. The illustrated transmitter 204 and receiver 206 communicate 210 using radio frequency (RF) transmissions. However it will be appreciated that any wireless technology may be utilized, for example, one of the IEEE (Institute of Electrical and Electronics Engineers) 802.11 wireless LAN (local area network) protocols. In one embodiment, the receiver 206 may issue a power-on command to the television or other monitor to ensure it is operable to display alerts. Such a power-on technique may be applied for all alerts or only serious violations. In one embodiment, the receiver and monitor are communicatively coupled, allowing the receiver to query the monitor for its power state, and to direct it to power-on if needed.

The television 208 is displaying some television program. However, in the lower left corner of the display, an alert 212 dialog is displayed on the television to notify a parent or other viewer of the television that there is some problem with the content being accessed by the personal computer 200. As shown in the enlargement 214 of the alert dialog 212, there is a problem with a chat application. A "wordwatcher," e.g., a keyword recognition component of content recognizer 112, has identified sexual content 216 in the chat session, and in response, the chat session has been cancelled 218. In one embodiment, alerts may be color coded to allow their immediate identification.

By presenting alerts 212 in such a manner on a household appliance such as the television 208, one may conveniently and remotely ensure the safety of children or other users of the monitored personal computer.

Figure 3:
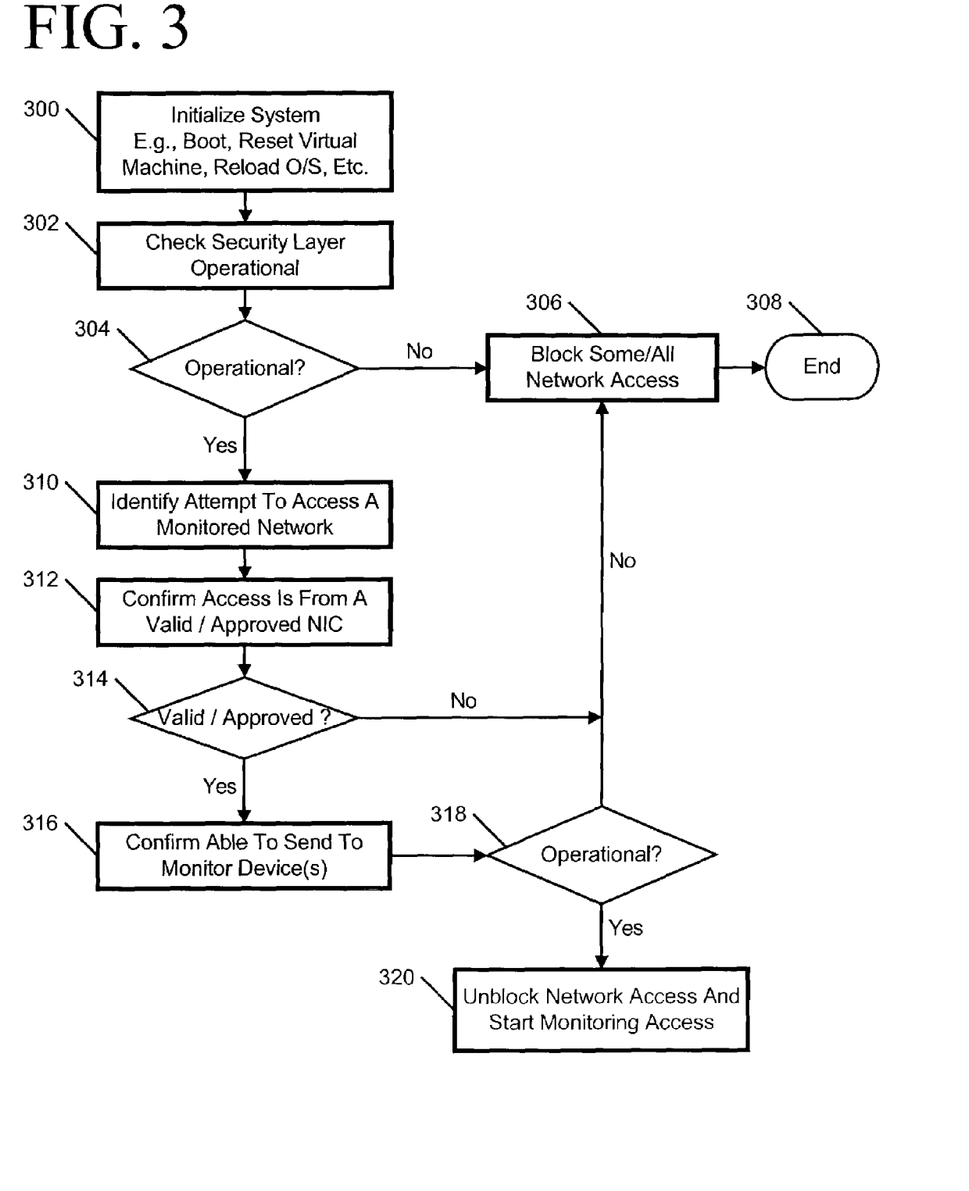
FIG. 3 illustrates initialization of a FIG. 1 system according to one embodiment.

FIG. 3 illustrates initialization of a FIG. 1 system according to one embodiment. The illustrated operations occur before ongoing monitoring of allowed network connectivity, and provide for restricting access to network data until monitoring equipment is confirmed as actively functioning.

While initializing 300 the device, e.g., booting, rebooting, resetting a virtual machine, reloading the device's operating system, etc., the security layer is checked 302 to ensure it is present and operational. If 304 not, then access is blocked 306 to some or all network data (some access may be granted for LAN data) and processing ends 308.

If 304 the security layer is operational, when it is identified 310 an attempt has been made to access a monitored network, e.g., a WAN such as the Internet may be monitored, while a LAN might not be monitored, in one embodiment, it confirmed 312 that the attempted access is from a valid or approved NIC. That is, a local network may be configured so that only known NICs are approved to access the monitored network, and unknown devices are restricted. If 314 the accessing NIC is not valid or approved, then access is blocked 306.

If 304 the NIC attempting access is valid or approved, a test 316 is performed to confirm that sending to the monitor device(s) is operational, e.g., that the FIG. 1 alert generator 106 can communicate with receiver 110, or the FIG. 2 transmitter 204 is operational and able to send alerts to the receiver 206 for the monitor 208. If 318 sending is operational, then access to the monitored network is unblocked 320, and monitoring is started for the accessed network data.

Figure 4:
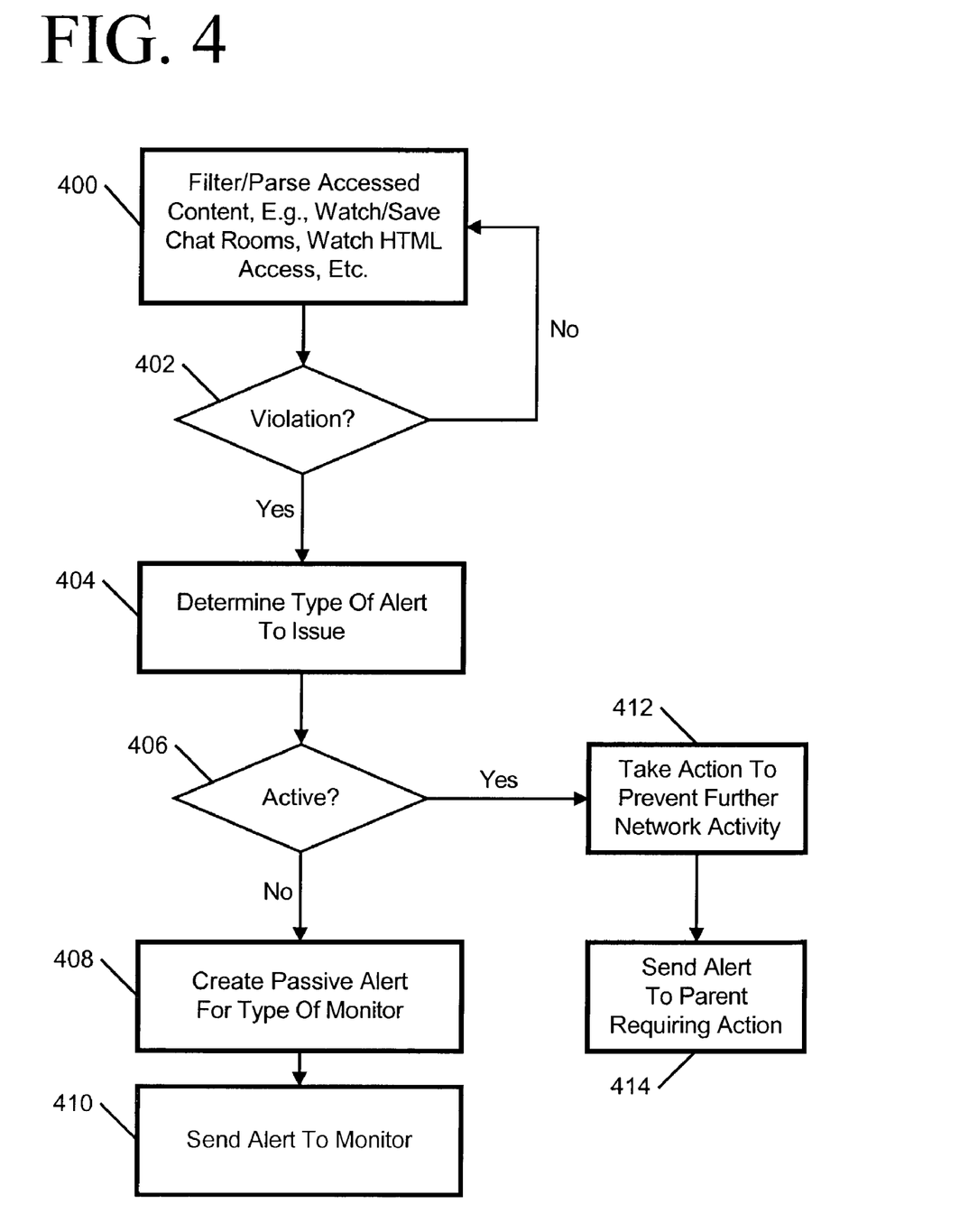
FIG. 4 illustrates a flowchart according to one embodiment for monitoring accessed network content.

FIG. 4 illustrates a flowchart according to one embodiment for monitoring accessed network content after network access has been unblocked 320. As discussed above for FIG. 1, content may be directly monitored if the security layer 102 is operating as a proxy or gateway, or a module of the application layer may forward some or all of accessed content for analysis.

Filters and/or parsers of the content recognizer 112 are applied 400 to accessed content to evaluate the content. The term "filters" is intended to generally reference various detection techniques known in the art, e.g., key word or key phrase searches, semantic analysis, and other language detection methods which may be applied to identify unacceptable content. The filters/parsers are expected to be applied to all accessed content, including browser content and real time chat sessions, in order to identify an unacceptable level of adult material during use of a monitored device by a minor or otherwise monitored individual.

A test is performed to determine if 402 the filters/parsers indicate a violation, e.g., unacceptable content has been monitored. If not, then monitoring can continue. However, if there has been a violation, then a determination 404 is made of the type of alert to issue in response to the violation. In the illustrated embodiment, an alert is somewhat simplistically restricted to being either active or passive. It will be appreciated that arbitrary alerts types may be defined. If 406 an active alert is not required, then a passive alert is created 408 for the monitor, e.g., the content for the alert dialog 212 (FIG. 2) is determined, and the alert is sent 410 to the monitor.

If 406 and active alert is required, such as when highly offensive data is monitored, then action is taken 412 to prevent further network access. For example, the process handler 118 may block communication ports and/or shutdown the network application in use that resulted in the violation. Note that for real-time applications such as instant messaging or chat programs, the real time communication may be logged by the security layer for later review of the violation. An alert may then be sent 414 to a parent or other authority or responsible entity indicating that action is required. In one embodiment, the parental override controller 126 (FIG. 1) may be used to acknowledge the alert and allow network access by the monitored device to continue. In one embodiment, sending the alert includes e-mailing the log of real-time communications (if applicable) to the parent or other authority or responsible entity.

Figure 5:
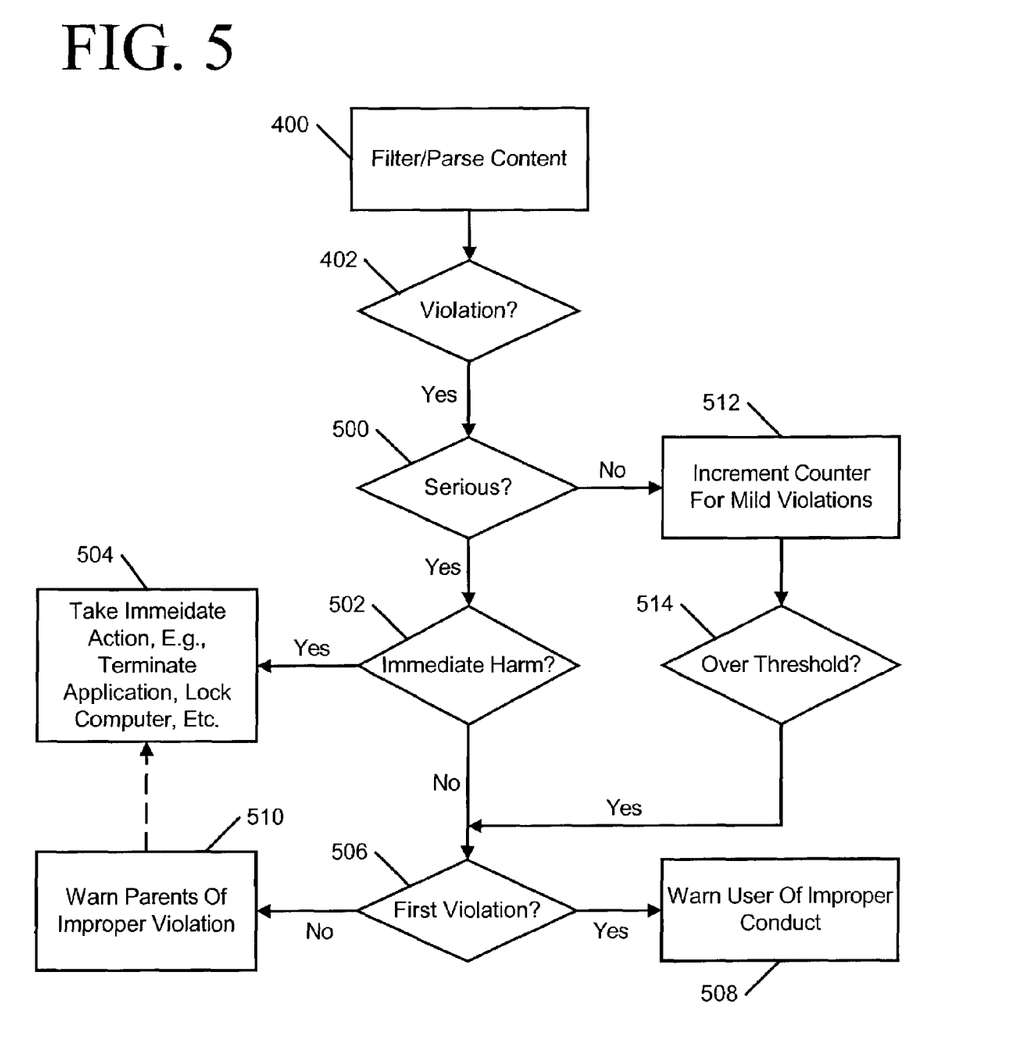
FIG. 5 illustrates a tiered approach to violations to allow handling different classes of violations differently.

FIG. 5 illustrates a variation of the FIG. 4 embodiment, in which a tiered approach is applied to violations to allow handling different classes of violations differently, e.g., to allow handling minor violations differently from serious violations, first offenses from subsequent offenses, etc.

After applying 400 filters and/or parsers to accessed content, if 402 there is a violation, in this embodiment, a test is performed to determine if 500 the violation is deemed serious, e.g., the content recognizer 112 of the FIG. 1 security layer identifies the content as a particularly egregious violation. A serious violation may be recognized based on certain key words or phrases in monitored content. If a serious violation is identified, another test may be performed to determine if 502 there is risk of immediate harm to the user of the monitored device. For example, certain language patterns in monitored communications may suggest a dangerous event is occurring, such as a possible solicitation for personal data about a child, e.g., address, age, etc. If it is deemed there is risk of immediate harm, then as discussed for FIG. 4 item 412, immediate action may be taken to prevent further harm.

If 500 the violation is serious, but there is no indication of imminent harm, then a further test may be performed to determine if 506 the violation is a first violation. If so, then rather than alerting the parent or other responsible entity, in this embodiment, the user of the monitored device is given a warning to avoid further violations. In effect, the user may be given one free strike before more significant action needs to be taken. That is, if 506 it is not the first violation, then parents or other responsible entity are warned 510 of the violation.

If 500 the violation was not serious, then a counter for non-serious violations is incremented 512, and a test performed to determine if 514 the counter exceeds a threshold. In this embodiment, even though a particular violation is deemed not serious, one may wish to label a series of such errors as a serious problem. Thus, if 514 the number of non-serious violations exceeds the threshold, then the violation is treated as would a serious but not immediately harmful violation, and thus the violation would be tested for being a first offense.

Although only first and subsequent violations are handled in the illustrated embodiment, it will be appreciated that many violation levels may be identified and responded to. For example, as violations occur, communication ports can be temporarily blocked, then the processes for offending network application program, e.g., browser, chat, email application, etc., can be terminated (with associated windows closed). As a more extreme countermeasure, access rights to application paths/shortcuts may be temporarily removed to prevent reactivating a particular network application program, screen savers may be triggered with a secret password activated, and assuming operating system support, a lockout/logoff event can be initiated. These response options represent actions that may be applied as sequential steps in a process that handles escalating detection of unacceptable material. However, it will be appreciated that these responses may form a part of a complete set of immediate actions that occur. This is an option that may be offered as configuration settings provided to the parent.

In one embodiment, pre-packaged sets of responses are provided for responding to certain alerts. For example, assume meta-data is associated with the device being monitored, such as the age of the child user, gender, etc. One pre-packaged response may be provided for handling a particular violation when a five year old is using the monitored system/device. A second pre-packaged response may be provided for handling the same violation in a different manner, such as by only sending an alert to the device user, when the user is known to be 15. Rating systems, such as those used for movies, may be associated with accessed content (either by a content vendor or the content recognizer), and used to select an appropriate pre-packaged response to apply.

In one embodiment, alerts are color coded to indicate severity and/or escalation status. For example, yellow colored alerts might be used for passive alerts, while red colored alerts used for active or severe alerts. It will be appreciated that colors, patterns, and display characteristics (e.g., bold, underline, blinking, etc.) may be used to visually cue alert characteristics with minimal usage of monitor real estate. In another embodiment, alerts may be compactly represented with an icon on the monitor, possibly with color cues, where a remote control, such as the parental override controller 126 (FIG. 1), may be used to expand the alert as shown in FIG. 2.

Figure 6:
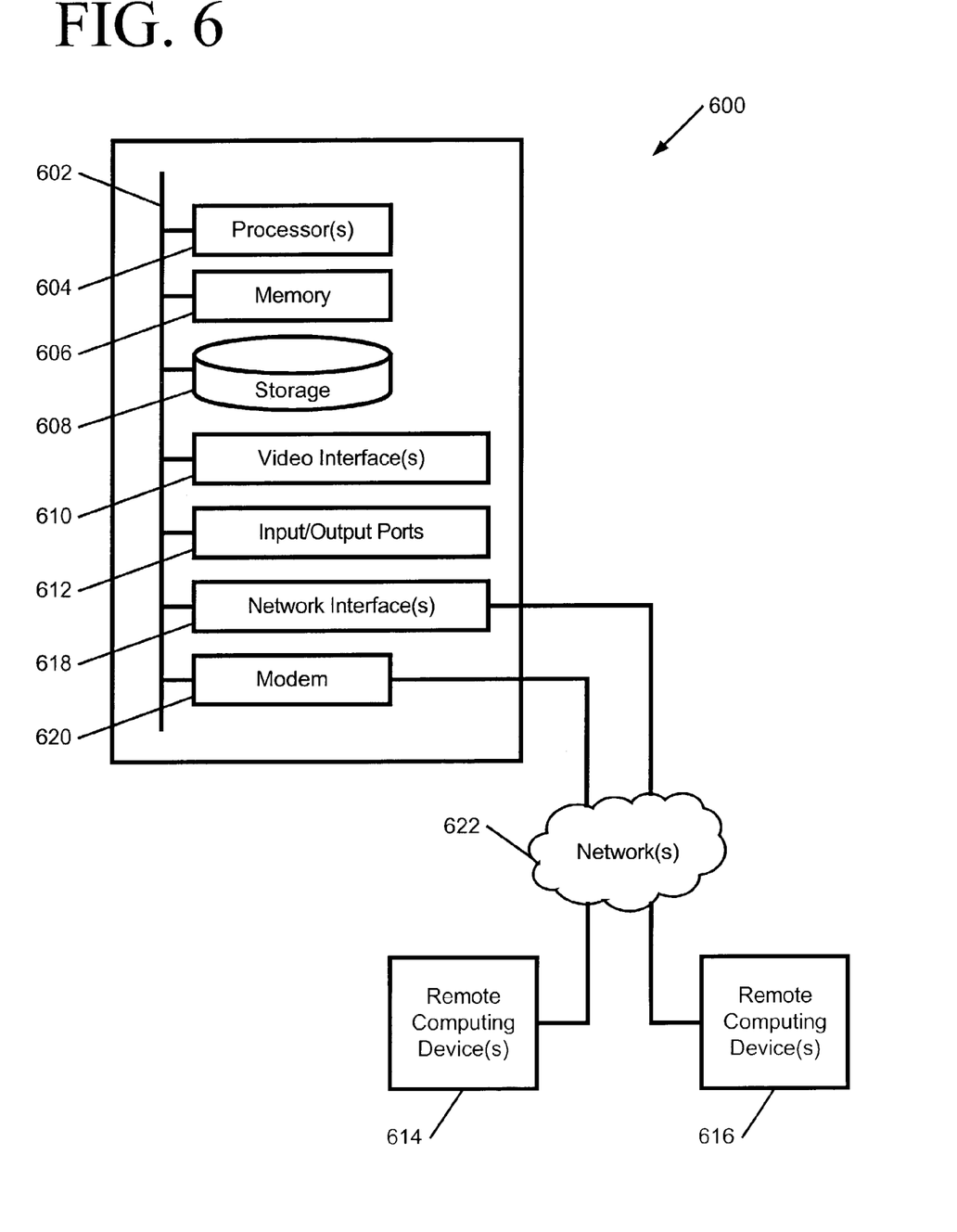
FIG. 6 illustrates a suitable computing environment in which certain aspects of the invention may be implemented.

FIG. 6 and the following discussion are intended to provide a brief, general description of a suitable environment in which certain aspects of the illustrated invention may be implemented. As used herein below, the term "machine" is intended to broadly encompass a single machine, or a system of communicatively coupled machines, devices, or virtual machines operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 600 that includes a system bus 602 to which is attached processors 604, a memory 606, e.g., random access memory (RAM), read-only memory (ROM), or other state preserving medium, storage devices 608, a video interface 610, and input/output interface ports 612. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 614, 616, such as through a network interface 618, modem 620, or other communicative coupling. Machines may be interconnected by way of a physical and/or logical network 622, an intranet, the Internet, local area networks, and wide area networks. One skilled in the art will appreciated that communication with network 622 may utilize various wired and/or wireless short range or long range carriers and protocols, including RF, satellite, microwave, IEEE 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 606, or in storage devices 608 and their associated storage media, including hard-drives, floppy-disks, optical storage, tapes, flash memory, memory sticks, digital video disks, biological storage, etc. Associated data may be delivered over transmission environments, including network 622, in the form of packets, serial data, parallel data, propagated signals, etc., and may be used in a compressed or encrypted format. Associated data may be used in a distributed environment, and stored locally and/or remotely for access by single or multi-processor machines.

Thus, for example, with respect to the illustrated embodiments, assuming machine 600 embodies the monitored device 100 of FIG. 1, then remote machines 614, 616 may respectively be a television for monitoring the device 100, and a second child's computer also being monitored by the television. It will be appreciated that remote machines 614, 616 may be configured like machine 600, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A system for monitoring network data accessed by a device, comprising:

a network interface having an identifier to communicatively couple the system with a network;

a network application program coupled to the network interface to access network data of one or more content providers of the network, the network data comprising one or more contents;

a forwarding module coupled to the network interface for forwarding some or all accessed network data to a content recognizer; and a security layer coupled to the forwarding module, including the content recognizer and an alert generator, the content recognizer configured to semantically analyze the network data to determine whether any of the one or more contents within the forwarded network data indicates a possible solicitation of personally-identifiable information, and, the alert generator operable to issue an alert to a monitoring device external to the system if possible solicitation of personally-identifiable information is identified by the content recognizer.

2. The system of claim 1, further comprising:
a monitor for displaying the alert;
a receiver attached to the monitor for receiving the alert and presenting the alert in a format suitable for display by the monitor; and
a transmitter attached to the device and communicatively coupling the alert generator and the receiver.

3. The system of claim 2, wherein the receiver and transmitter utilize a wireless communication technology.

4. The system of claim 2, wherein the monitor comprises a television.

5. The system of claim 1, wherein the device is a child's computer.

6. The system of claim 1, further comprising:
a monitor for displaying the alert; and
an override controller to allow issuing a response to an alert displayed on the monitor.

7. The system of claim 6, wherein the alert displayed on the monitor indicates access to the network has been denied, and wherein the response may instruct the security layer to allow continued access to the network.

8. The system of claim 1, wherein the security layer further comprises a process handler for controlling application programs operating on the device.

9. A method comprising:
receiving, by a network application program of a computing system, network data of a network accessible by the host, the network data comprising one or more contents;
semantically analyzing, by a content recognizer of the computing system, the one or more contents to determine whether any of the one or more contents indicates a possible attempt to solicit personally-identifiable information; and
issuing, by an alert generator of the computing system, an alert to a monitoring device external to the host if the one or more contents is determined to indicate a personally-identifiable information solicitation.

10. The method of claim 9 further comprising blocking, by the network application program of the computing system, access to the network data if the network data is determined to indicate a personal solicitation.

11. The method of claim 9 wherein the semantic analysis comprises analyzing one or more of a keyword or a key phrase.

12. The method of claim 9 wherein the semantic analysis comprises evaluating the received network data for requests for an age or an address of a user.

13. The method of claim 9 wherein the predetermined criteria comprises a plurality of categories of unacceptable content and the issued alert is one of a plurality of alert types correlating to the plurality of categories.

14. The method of claim 9 wherein the content recognizer is part of a security layer of the computing system and the method further comprises preventing receipt of the network data until the security layer including the content recognizer is initialized.

15. An apparatus comprising:
a network interface to receive network data of a network accessible by the apparatus, the network data comprising one or more contents;
processor coupled to the network interface;
a content analyzer to be operated by the processor to semantically analyze the one or more contents to determine whether any of the one or more contents indicates an attempt to solicit personally-identifiable information; and
an alert generator to be operated by the processor to issue an alert, via the network interface, to a monitoring device external to the apparatus if the one or more contents is determined to indicate a personally-identifiable information solicitation.

16. The apparatus of claim 15 further comprising a content blocker to be operated by the processor to block access to network data determined to be a personally-identifiable information solicitation.

17. The apparatus of claim 15 wherein the syntactic analysis includes analyzing whether the network contains requests for an age or an address of a user.

18. The apparatus of claim 15 wherein the predetermined criteria comprises a plurality of categories of unacceptable content and the issued alert is one of a plurality of alert types correlating to the plurality of categories.

19. An article of manufacture comprising:
a plurality of machine accessible instructions stored on a storage medium and designed to program an apparatus to:
receive network data of a network accessible by the apparatus, the network data comprising one or more contents;
semantically analyze the one or more contents to determine whether any of the one or more contents indicates a possible attempt to solicit personally-identifiable information; and
issue an alert, via the network interface, to a monitoring device external to the apparatus if the one or more contents is determined to be a possible personally-identifiable information solicitation.

20. The article of claim 19 wherein the plurality of machine accessible instructions are further designed to program the apparatus to block the network data if the network data is determined to be a personally-identifiable information solicitation.

21. The article of claim 19 wherein the plurality of programming instructions are adapted to determine whether the network contents contains requests for a user's age or address.

* * * * *